United States Patent
Nguyen et al.

(10) Patent No.: US 7,950,412 B2
(45) Date of Patent: May 31, 2011

(54) NON-REMOVABLE REFILL RESTRICTOR APPARATUS

(75) Inventors: Jack Nguyen, San Clemente, CA (US); Christopher Coppock, Laguna Niguel, CA (US)

(73) Assignee: Fluidmaster, Inc., San Juan Capistrano, CA (US)

( * ) Notice: Subject to any disclaimer, the term of this patent is extended or adjusted under 35 U.S.C. 154(b) by 916 days.

(21) Appl. No.: 11/586,395

(22) Filed: Oct. 25, 2006

(65) Prior Publication Data

US 2008/0169029 A1    Jul. 17, 2008

(51) Int. Cl.
*F16K 31/18* (2006.01)
(52) U.S. Cl. ......... 137/441; 137/798; 285/305; 285/921
(58) Field of Classification Search .......... 137/441, 137/442, 444, 434, 436, 798; 285/239, 242, 285/252, 305, 921
See application file for complete search history.

(56) References Cited

U.S. PATENT DOCUMENTS

| 793,103 | A | * | 6/1905 | Scholtz | 285/113 |
| 2,777,460 | A | | 1/1957 | Svirsky | 137/218 |
| 3,207,170 | A | * | 9/1965 | Fulton | 137/216 |
| 3,853,141 | A | | 12/1974 | Fischer | 137/436 |
| 4,699,169 | A | | 10/1987 | Sherby | 137/434 |
| 5,134,729 | A | | 8/1992 | Shaw | 4/415 |
| 5,708,991 | A | | 1/1998 | DeMarco | 4/415 |
| 5,738,141 | A | * | 4/1998 | Blanke et al. | 137/414 |
| 5,887,294 | A | | 3/1999 | Yeung | 4/415 |
| 6,823,889 | B1 | | 11/2004 | Schuster | 137/441 |

OTHER PUBLICATIONS

International Search Report, PCT/US07/11756, Dec. 26, 2007.

* cited by examiner

*Primary Examiner* — Craig M Schneider
(74) *Attorney, Agent, or Firm* — Gordon & Rees LLP

(57) ABSTRACT

A toilet refill restrictor apparatus includes an adapter interposed between a fill valve and a refill hose. The adapter is non-removably coupled to the fill valve and is configured with a larger proximal pathway, and a smaller distal metering pathway for restricting the refill flow rate. The adapter may be coupled to a shortened horizontal outlet formed at a top portion of the fill valve. The horizontal outlet is shortened to a length such that the refill hose cannot be connected directly to the outlet. The adapter may also be coupled to a fill valve without a horizontal outlet where an exit port is defined in the vertical conduit of the fill valve. The adapter includes a securing mechanism to prevent removal from the fill valve without excessive force or breaking the adapter.

12 Claims, 8 Drawing Sheets

NON-REMOVABLE REFILL RESTRICTOR APPARATUS

BACKGROUND OF THE INVENTION

1. Field of the Invention

The present invention relates generally to couplings for toilets and, more specifically, to couplings between fill valves and refill hoses.

2. Description of Prior Art and Related Information

As the need for water conservation continues to grow, water agencies and other municipal entities are placing strict demands on the water consumption of toilets. These requirements have also begun to appear in the form of regulations on the types of components within a toilet. The need for more efficient water usage has resulted in certain requirements for uniformity in the components such that these components cannot be adjusted by end users or professionals so as to defeat the water saving features of the toilet system.

A recent trend in legislation has been to require toilet components to be non-adjustable. That way, a toilet system originally manufactured with the intent of conserving water will be effective to accomplish the purpose for which it was designed without interference from an end user or plumber who might otherwise tweak the system. This also eliminates the need to increase water supply, such as building a new and expensive water plant.

One conventional approach to conserving water in toilets has been to restrict the water flow from the fill valve to the refill which that ultimately directs water to refill the toilet bowl. Accordingly, various adapters that reduce water flow have been inserted in between the horizontal outlet of a typical refill valve and the refill hose. The problem with many conventional refill adapters is that such adapters may be easily removed, thereby enabling a user or technician to simply connect the refill hose directly to the outlet of the refill valve. This results in greater water flow from the fill valve to the refill hose, thereby defeating the water conservation purpose of the conventional adapter.

Accordingly, a great need exists for a non-removable water saving adapter designed to couple a refill hose to a fill valve.

Furthermore, toilet fill valves come in all shapes and sizes. This is particularly true of the outlets of such valves. Therefore, to achieve a desired output of water, a unique adapter with specific dimensions would have to be specially provided for connecting to each fill valve, or more specifically to the outlets thereof.

Thus, a great need also exists for adapters having certain universal dimensions such that they can be fitted with a variety of different fill valves for accomplishing a variety of different flow rates.

SUMMARY OF THE INVENTION

The present invention provides structures and methods which overcome the deficiencies in the prior art.

In one aspect, a toilet apparatus comprises a fill valve defining a refill port, and an adapter fixedly coupled to the fill valve and configured to direct fluid from the refill port to a refill hose. The adapter includes a proximal tubular portion, a distal tubular portion, and a securing mechanism fixedly coupled to the fill valve. The securing mechanism may comprise a finger configured to hook into a vent hole of the refill device.

The fill valve comprises a laterally extending outlet that defines the refill port. The laterally extending outlet comprises a tube with a lateral length preferably between 0.1 inch to 0.8 inch. The proximal tubular portion comprises a proximal inner diameter and a proximal outer diameter, the proximal outer diameter being configured to form a press fit with the laterally extending tube. The proximal inner diameter comprises a range preferably between 0.1 inch and 0.6 inch. The distal tubular portion comprises a distal inner diameter and a distal outer diameter, the distal inner diameter comprises a range between 0.050 inch and 0.200 inch.

The apparatus may comprise a kit with multiple adapters. Where the first adapter comprises a first proximal tubular portion with a first proximal inner diameter and a first distal tubular portion with a first distal inner diameter, the apparatus may further comprise a second adapter including a second proximal tubular portion and a second distal tubular portion. The second proximal tubular portion comprises a second proximal inner diameter that is substantially similar to the first proximal inner diameter. The second distal tubular portion comprises a second distal inner diameter that is greater than the first distal inner diameter.

In another aspect, a toilet apparatus may include the fill valve as well. The toilet apparatus comprises a conduit defining a port, a proximal tubular portion, a distal tubular portion, and a securing mechanism for coupling the proximal tubular portion and the distal tubular portion to the conduit. The conduit is configured to direct refill water to the port. The proximal tubular portion has a proximal inner diameter and a proximal outer diameter that is configured to form a press fit with the port. The distal tubular portion has a distal inner diameter and a distal outer diameter. The distal inner diameter comprises a range preferably between 0.050 inch and 0.200 inch.

The conduit may comprise a vertical annular wall where the port is defined in the vertical annular wall. Alternatively, the conduit may also comprise a horizontal outlet where the port is defined in the horizontal outlet. The apparatus may further comprise a guard surrounding the proximal tubular portion.

In a further aspect, a method of manufacturing a toilet coupling is provided. The method comprises the steps of providing a toilet fill valve with a vertical conduit, forming a port on the toilet fill valve, providing an adapter with a proximal pathway and a distal metering pathway and non-removably coupling the adapter to the fill valve.

The method may further comprise forming a horizontal outlet on the toilet fill valve with a horizontal distance of less than 0.8 inch from the vertical conduit, where the horizontal outlet defines the port. The step of non-removably coupling the adapter to the fill valve comprises forming a press fit between the adapter and the horizontal outlet. The step of non-removably coupling the adapter to the fill valve may also comprise securing the adapter to the toilet fill valve with a securing mechanism.

The method also includes manufacturing a kit of adapters with different distal, metering inner diameters. Where the adapter is a first adapter with a first proximal pathway, a first proximal inner diameter, a first distal pathway and a first distal inner diameter, the method further comprises providing a second adapter with a second proximal pathway and a second distal pathway. The step of providing the second adapter with the second proximal pathway and the second distal pathway comprises forming the second proximal pathway with a second proximal inner diameter substantially similar to the first proximal inner diameter, and forming the second distal pathway with a second distal inner diameter larger than the first distal inner diameter.

In a further aspect, a method for restricting refill flow in a toilet is provided. The method comprises directing refill water out from a fill valve through a port, restricting a flow rate of the refill water exiting the port with a restrictor, and preventing removal of the restrictor. Where the restrictor comprises an adapter with a metering pathway, the method further comprises restricting the flow rate of the refill water exiting the port with the restrictor comprises directing the refill water through the adapter, and preventing removal of the restrictor comprises non-removably coupling the adapter to the fill valve.

Where the restrictor further comprises a horizontal outlet, the step of non-removably coupling the adapter to the fill valve comprises non-removably coupling the adapter to the horizontal outlet. The step of preventing removal of the restrictor may further comprise coupling a refill hose to the adapter.

The method further comprises preventing a direct connection between the refill hose and the fill valve without interposing the adapter.

The step of restricting a flow rate of the refill water exiting the port with a restrictor comprises directing the refill water through an adapter having a proximal pathway with a first inner diameter and a distal pathway with a second inner diameter lesser than the first inner diameter.

In summary, a toilet refill restrictor apparatus includes an adapter interposed between a fill valve and a refill hose. The adapter is non-removably coupled to the fill valve and is configured with a larger proximal pathway, and a smaller distal metering pathway for restricting the refill flow rate. The adapter may be coupled to a shortened horizontal outlet formed at a top portion of the fill valve. The horizontal outlet is shortened to a length such that the refill hose cannot be connected directly to the outlet. The adapter may also be coupled to a fill valve without a horizontal outlet where an exit port is defined in the vertical conduit of the fill valve. The adapter includes a securing mechanism to prevent removal from the fill valve without excessive force or breaking the adapter.

The invention, now having been briefly summarized, may be better appreciated by the following detailed description.

DETAILED DESCRIPTION OF THE PREFERRED EMBODIMENTS

The invention and its various embodiments can now be better understood by turning to the following detailed description wherein illustrated embodiments are described. It is to be expressly understood that the illustrated embodiments are set forth as examples and not by way of limitations on the invention as ultimately defined in the claims.

Figure 1:
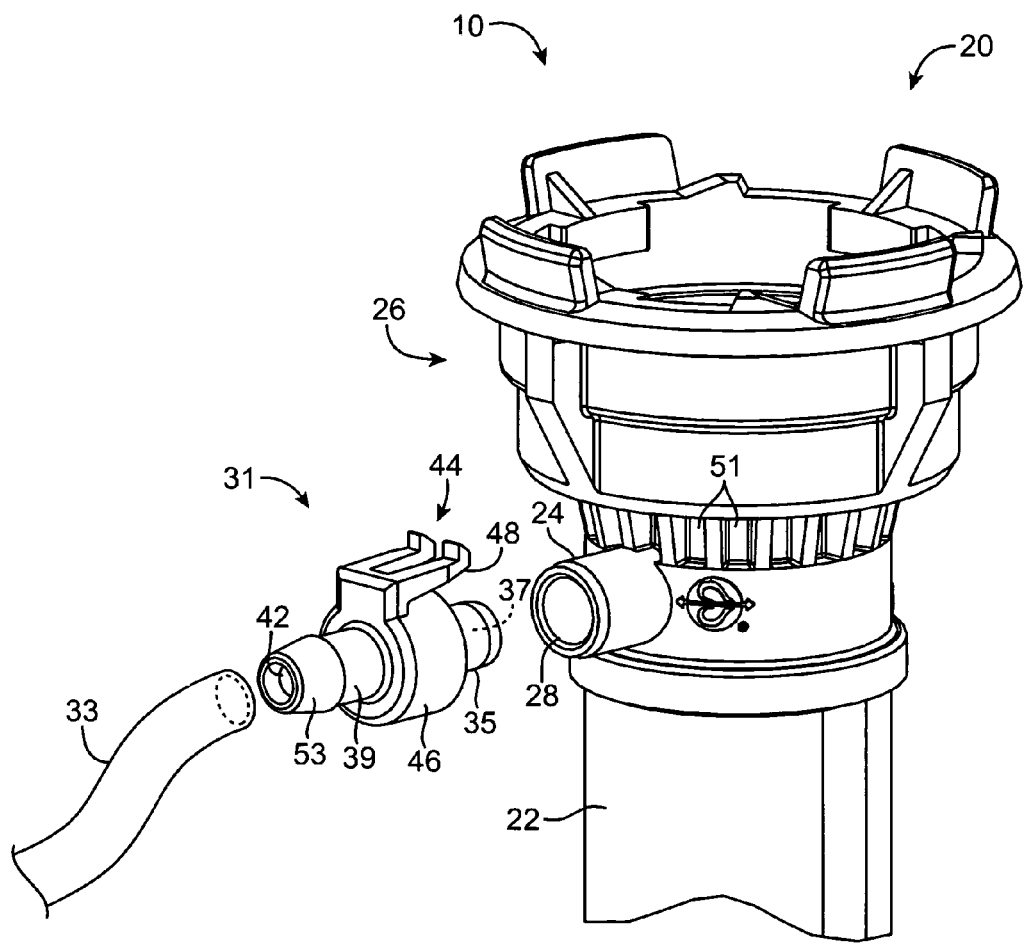
FIG. 1 is a perspective, exploded view of a preferred embodiment of a refill restrictor apparatus according to the invention.

FIG. 1 is an exploded, perspective view of a first preferred embodiment of a refill restrictor apparatus 10 for use in connection with a toilet tank. The system 10 comprises a fill valve 20 having a vertical conduit 22. A shortened horizontal outlet 24 of particular interest to the invention is disposed at a top portion 26 of the fill valve 20. As an example and not by way of limitation, the horizontal outlet 24 may comprise a horizontal length in the preferred range of 0 to 0.8 inch measured from the vertical conduit 22. In particular, the horizontal outlet 24 comprises a shortened horizontal length with respect to conventional fill valve outlets such that a refill hose would not be able to connect directly to Applicant's outlet 24. The outlet 24 defines a port 28 to direct fluid out from the fill valve 20.

Figure 2:
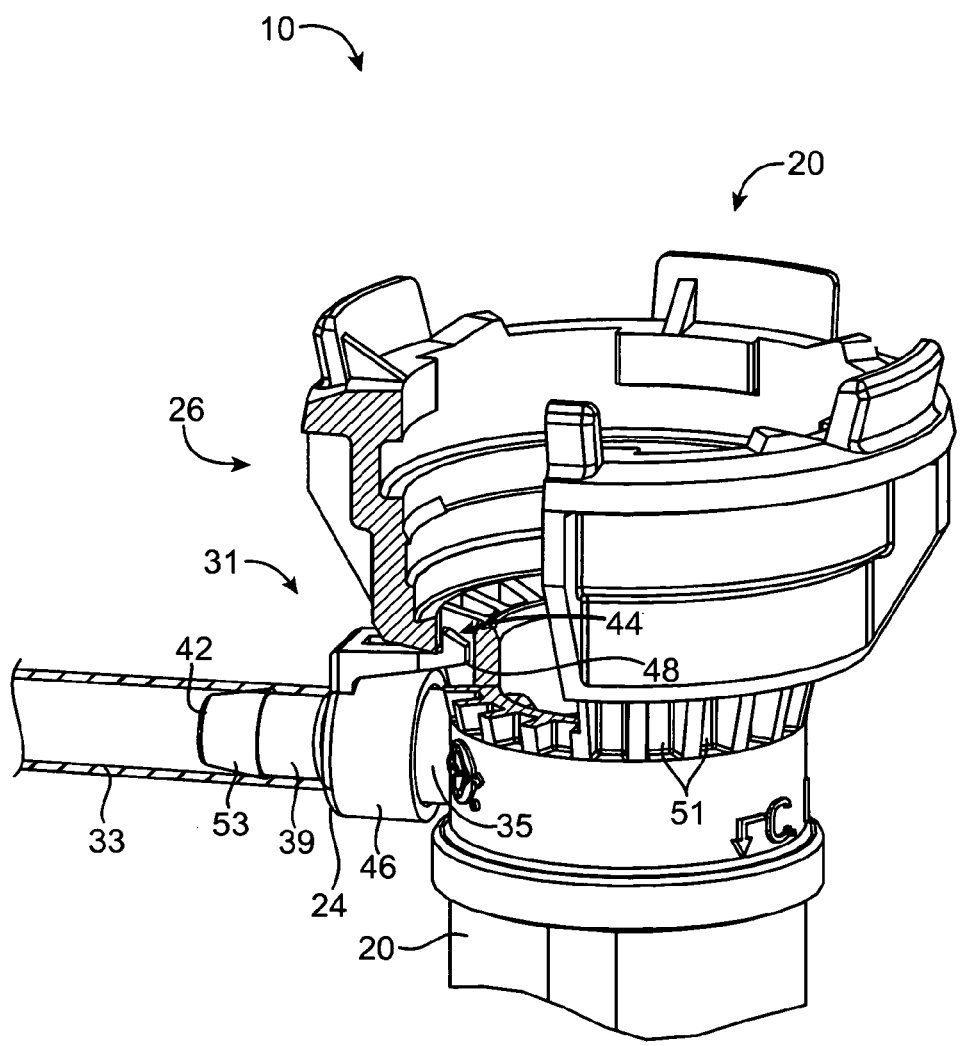
FIG. 2 is a perspective view of the preferred embodiment of the refill restrictor apparatus as assembled.
Figure 3:
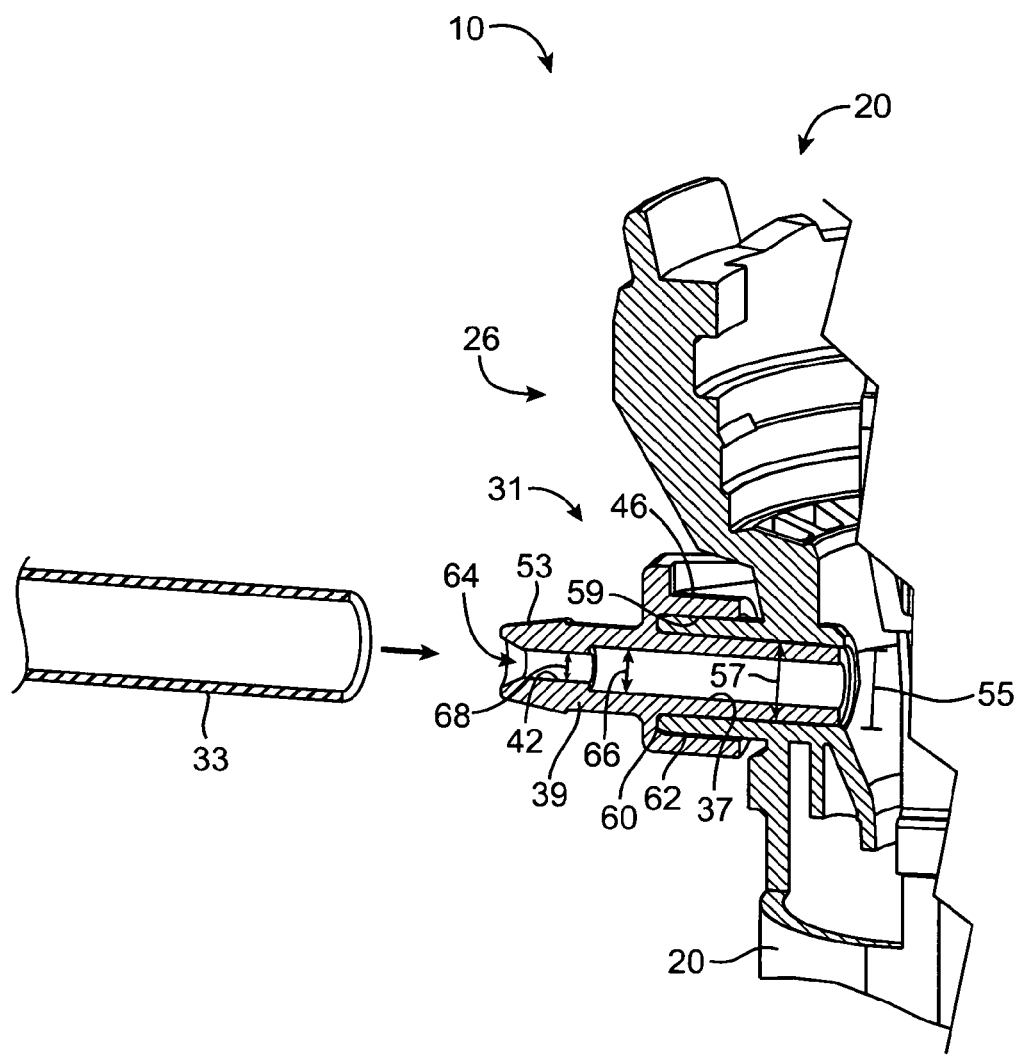
FIG. 3 is a partial cutaway cross-sectional view of the preferred embodiment of the refill restrictor apparatus.

In FIGS. 2 and 3, in conjunction with the shortened horizontal outlet 24, a non-removable adapter 31 is provided to couple a refill hose 33 to the fill valve 20, and thereby provide restricted fluid communication between the port 28 and the refill hose 33. The adapter 31 includes a proximal tubular portion 35, a proximal pathway 37, a distal tubular portion 39 and a distal pathway, or metering pathway, 42, shown more clearly in FIG. 3. The adapter 31 also includes a securing mechanism 44 to affix the adapter 31 to the fill valve 20 such that the adapter 31 cannot be manually removed therefrom. The securing mechanism 44 may comprise an outer cylindrical sleeve 46 and the proximal tubular portion 35 configured to form a press fit with the horizontal outlet 24, as well as fingers 48 to hook into vent ports 51 defined in the top portion 26 of the fill valve 20.

It is to be expressly understood that excessive force could potentially remove the adapter 31 from the fill valve 20. Accordingly, the non-removable adapter 31 is configured so as to prevent manual force from disengaging the adapter 31 from the fill valve 20. In particular, the adapter 31 is configured to withstand forces of 20 lbs. or less. In other words, a force greater than 20 lbs. would be required to potentially disengage the adapter 31 from the fill valve 20. It is to be expressly understood that a variety of different approaches and/or mechanisms may be employed to provide a non-adjustable coupling between the adapter 31 and the fill valve 20, including, but not limited to, adhesives, ultrasonic welding, heat staking, mounting screws, set screws, threaded fittings, locking key (cotter pin) arrangement; ferrule/sleeve swaging, and more.

In FIGS. 2 and 3, the distal tubular portion 39 of the adapter 31 comprises the barb fitting 53 to facilitate a secure connection with the refill hose 33. The proximal tubular portion 35 comprises an outer diameter 55 that is configured to form a tight press fit with the inner diameter 57 of the horizontal outlet 24. Furthermore, an additional tight press fit is provided between the inner surface 59 of the cylindrical sleeve 46 and the outer surface 62 of the outlet 24. Thus, the sleeve 46 forms an annular channel 60 that tightly receives and forms a press fit with the cylindrical horizontal outlet 24. Additionally, the fingers 48 further assist to provide a non-removable coupling between the adapter 31 and the outlet 24.

As shown more clearly in FIG. 3, the adapter 31 defines the proximal pathway 37 and the distal pathway 42 that collectively form a passageway 64 which provides fluid communication between the port 28 and the refill hose 33. The proximal pathway 37 is configured with a proximal inner diameter 66 that is generally larger to enable maximum flow of water therethrough. In contrast, the distal pathway 42 comprises a distal inner diameter 68 that is smaller than the proximal inner diameter 66 so as to restrict, or limit, the flow rate of the water passing therethrough.

Figure 4:
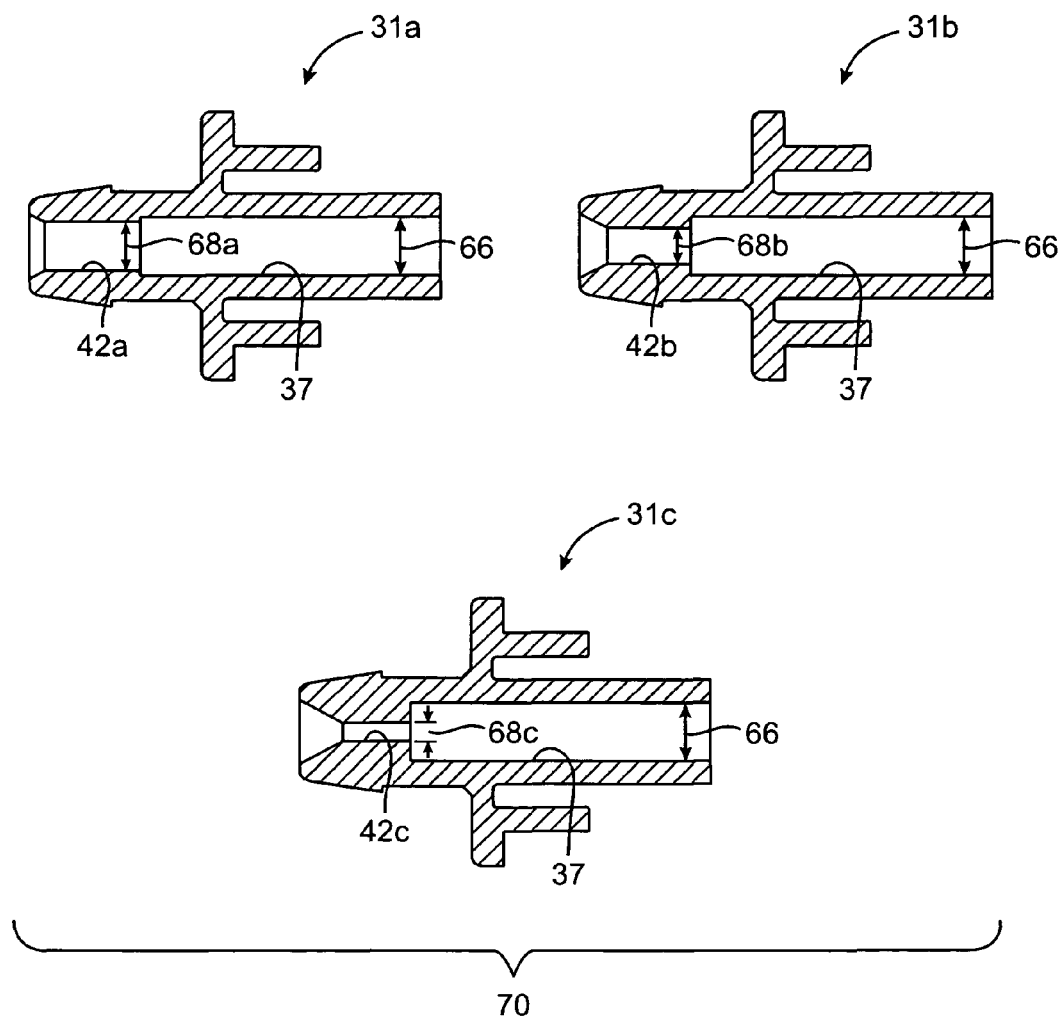
FIG. 4 illustrates a kit of preferred refill adapters according to the invention.

As discussed more fully below in connection with the preferred method of manufacturing shown in FIG. 8, it will be appreciated that a kit, or a plurality, of adapters with differing refill throughputs, which can be quantified as refill flow percentage rates, may be provided according to the invention. In FIG. 4, the kit 70 may include a plurality of adapters 31a-c, each with the identical proximal pathway 37 having exactly the same proximal inner diameter 66, but having a different distal metering pathway 42a-c with differing distal inner diameters 68a-c, respectively. As examples and not by way of limitation, the distal inner diameters 68a-c may have a preferred range of 0.050 inch to 0.300 inch to provide different metering of the refill flow rate between the fill valve and the refill hose.

Therefore, different metering of the refill output may be accomplished with a preferred kit of refill adapters 31a-c having universal, or standardized, proximal pathways and differing metering pathways of varying distal inner diameters. Furthermore, each adapter 31a-c of a particular output restriction may be provided with a different color or some other visible indicia to indicate such particular refill flow rate, or refill flow percentage rate.

Figure 5:
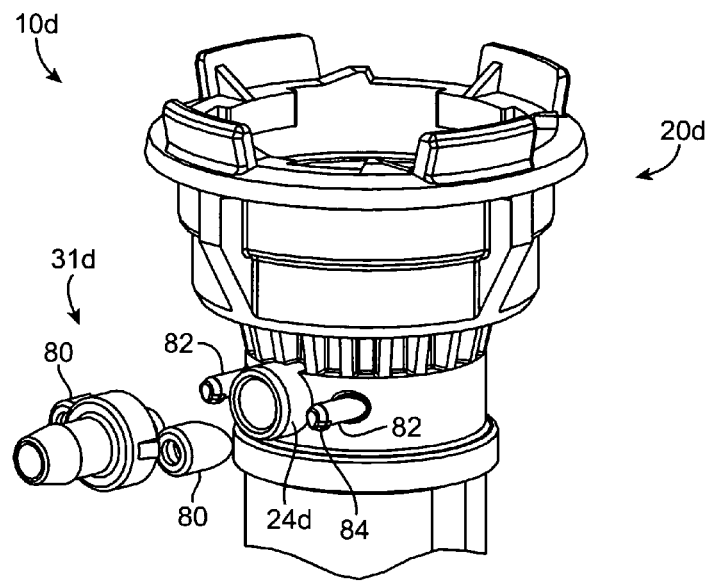
FIG. 5 is an exploded view of a second preferred embodiment of a refill restrictor apparatus.
Figure 6:
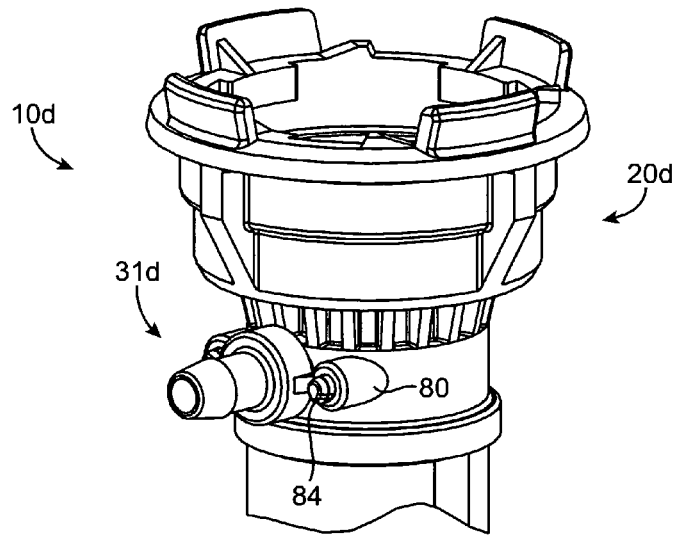
FIG. 6 is a perspective view of the second preferred embodiment of the refill restrictor apparatus.

In FIGS. 5 and 6, a second preferred embodiment of a refill restrictor apparatus 10d is illustrated where elements of similar structure are designated by the same reference numerals followed by the lower case "d". The apparatus 10d comprises a second preferred refill adapter 31d that is substantially similar in structure and operation as the first preferred refill adapter 31 illustrated in FIGS. 1-4 except that the fingers 48 in the first preferred adapter 31 are replaced with a pair of ferrules, or sleeves, 80 in the second preferred embodiment. The fill valve 20d in the second preferred apparatus 10d comprises at least one, but preferably two, shafts 82 that protrude horizontally from opposing sides of the horizontal outlet 24d. Each shaft 82 includes a distal protuberance 84 that functions as a ratchet to prevent the adapter 31d from being removed once the ferrules 80 are sleeved onto the shafts 82.

Figure 7:
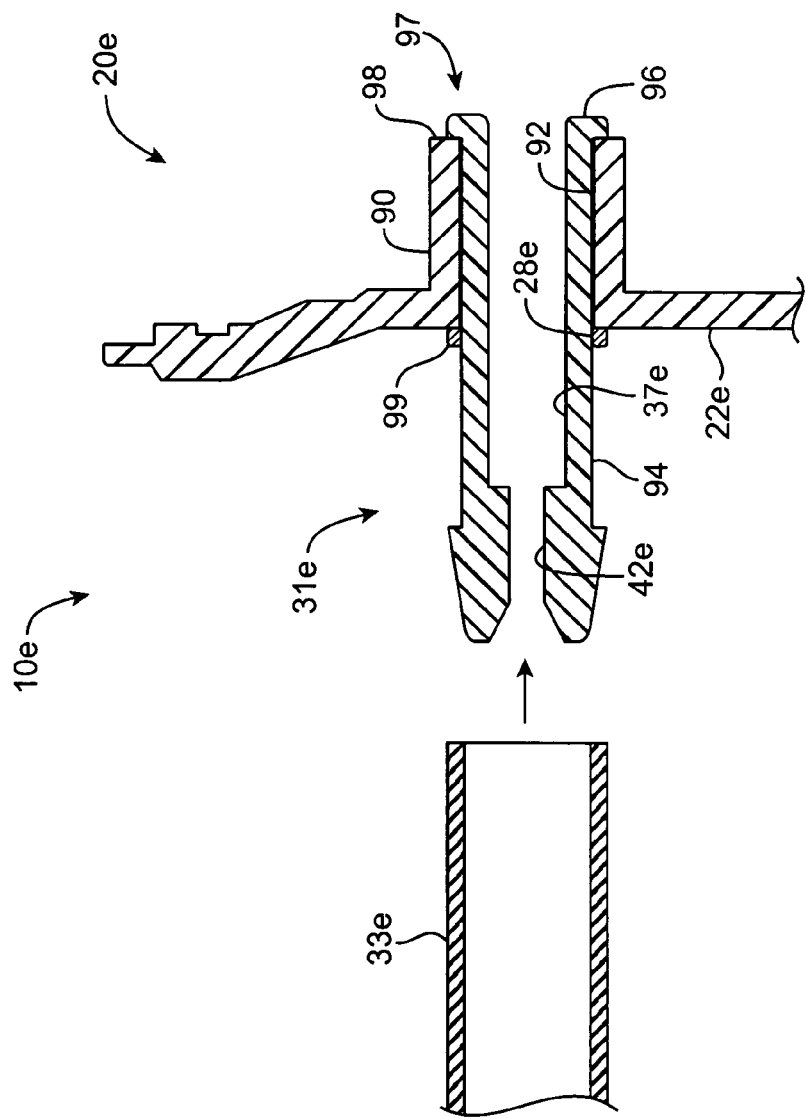
FIG. 7 is a cross-sectional view of a third preferred embodiment of a refill restrictor apparatus.

FIG. 7 is a cross-sectional view of a third preferred embodiment of a refill restrictor apparatus 10e where elements of similar structure are designated by the same reference numerals followed by the lower case "e". In the third preferred apparatus 10e, the horizontal outlet 24 of the first preferred apparatus 10 shown in FIGS. 1-4 has been omitted. Accordingly, an exit port 28e is formed in the body of the vertical conduit 22e of the fill valve 20e. A horizontal inner valve tube 90 defines an opening 92 for directly receiving an adapter 31e.

In the third preferred apparatus 10e, the adapter 31e comprises a tubular body 94 that is inserted into the opening 92. The adapter 31e may comprise tabs 96, a ratchet mechanism, or any other type of one-way securing mechanism at a proximal end 97 that enables the adapter 31e to be inserted into the opening 92, but prevents the adapter 31e from being removed or disengaged therefrom. In the illustrated embodiment, the tabs 96 engage the proximal end 98 of the inner valve tube 90. The adapter 31e is thus non-removably coupled to the fill valve 20e.

The adapter 31e also comprises a relatively larger proximal pathway 37e, and a smaller distal pathway, or metering pathway, 42e. A seal 99, such as an O-ring, is disposed around the tubular body 94 and configured to form a seal with the outer surface of the vertical conduit 22e around 28e so as to prevent leakage of refill water.

It will be appreciated that by omitting the horizontal outlet altogether, the third preferred apparatus 10e makes the use of the adapter 31e mandatory in order to couple a refill hose 33e to the fill valve 20e. If the adapter 31e were somehow to be broken off or disengaged from the fill valve 20e, the refill hose 33e could not be connected to the fill valve 20e. Thus, as with all preferred embodiments discussed herein, the third preferred apparatus 10e provides a non-removable, non-adjustable refill system that necessarily results in restricted fluid communication between the fill valve and the refill hose.

Moreover, all of the preferred embodiments of the restrictor apparatus discussed herein make it impossible to connect the refill hose directly to the fill valve without use of a restricting adapter. Accordingly, each preferred restrictor apparatus discussed herein necessitates the use of an adapter to couple the refill hose to the fill valve, which ultimately results in restriction of the fluid flow rate from the fill valve to the refill hose.

Figure 8:
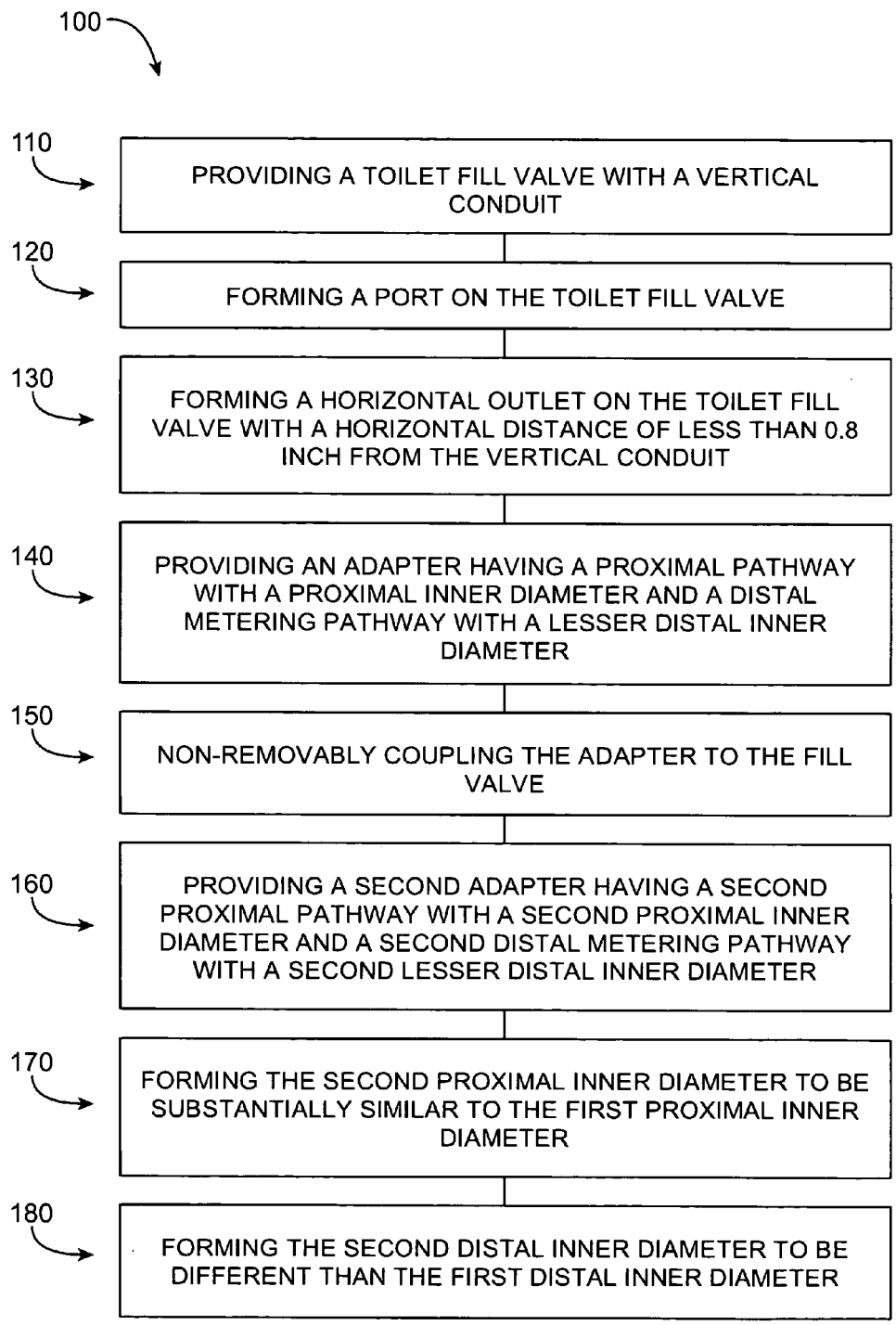
FIG. 8 is a diagram of a preferred method of manufacturing a refill fluid restrictor coupling between a fill valve and a refill hose.

FIG. 8 illustrates a preferred method 100 of manufacturing a toilet coupling, and more specifically, a refill restrictor coupling. The method 100 comprises a step 110 of providing a toilet fill valve with a vertical conduit. Step 120 includes forming a port on the toilet fill valve. Step 130 comprises forming a horizontal outlet on the toilet fill valve with a horizontal distance of less than 0.8 inch from the vertical conduit, and even more preferably less than 0.5 inch therefrom. In step 130, the port is defined by the horizontal outlet.

Step 140 comprises providing an adapter having a proximal pathway with a proximal inner diameter and a distal metering pathway with a lesser distal inner diameter. Step 150 comprises non-removably coupling the adapter to the fill valve. This step 150 comprises preventing the adapter from being removed from the fill valve withstanding a force up to 20 lbs. This step 150 may also comprise forming a press fit between the adapter and the horizontal unit, and/or securing the adapter to the fill valve with a securing mechanism.

The method 100 also comprises forming a kit of adapters with different distal, metering inner diameters. Accordingly, step 160 comprises providing a second adapter having a second proximal pathway with a second proximal inner diameter and a second distal metering pathway with a second lesser distal inner diameter. In step 170, the second proximal inner diameter is formed to be substantially similar to the first proximal inner diameter. In step 180, the second distal inner diameter is formed with a different dimension than the first distal inner diameter.

Figure 9:
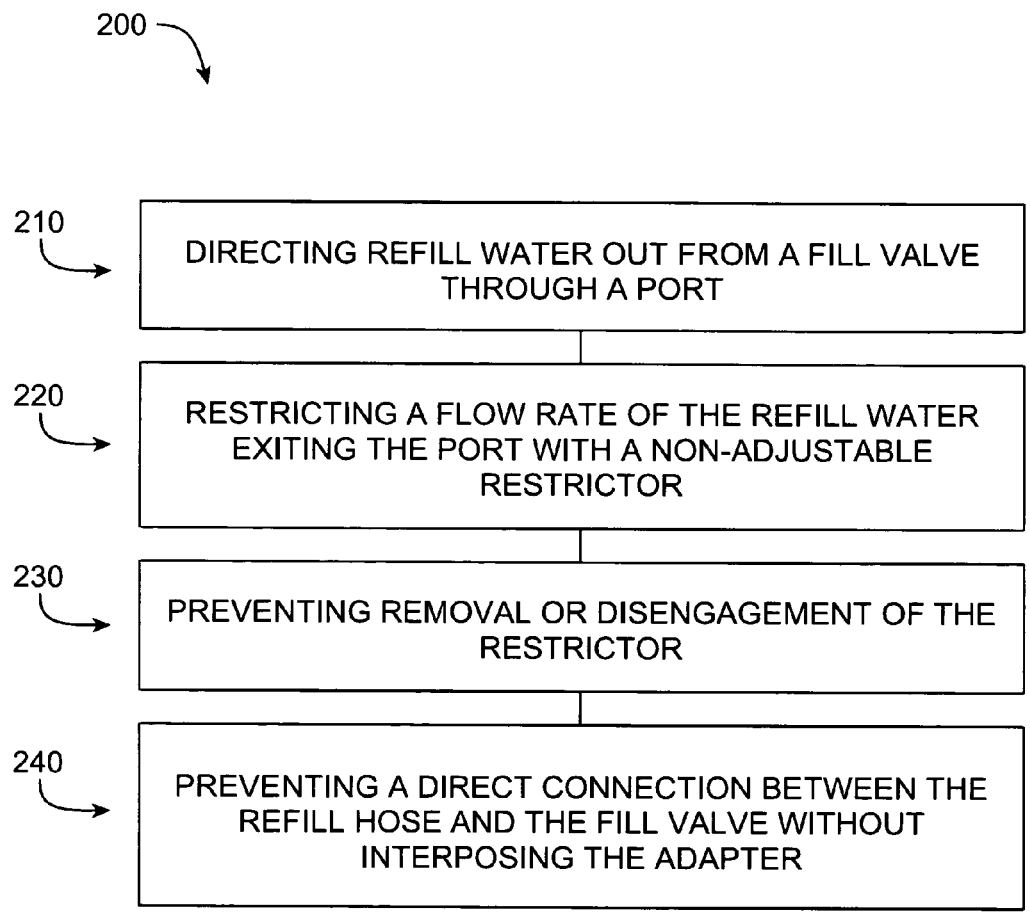
FIG. 9 is a diagram of a preferred method for restricting refill flow in a toilet.

FIG. 9 illustrates a preferred method 200 for restricting refill flow in a toilet. The method 200 comprises a step 210 of directing refill water out from a fill valve through a port. Step 220 comprises restricting a flow rate of the refill water exiting the port with a non-adjustable restrictor. Step 220 may comprise directing the refill water through an adapter having a metering pathway, such as a distal pathway with a smaller inner diameter than the inner diameter of a proximal pathway.

Step 230 comprises preventing removal or disengagement of the restrictor. This step 230 may comprise non-removably coupling an adapter with a metering pathway to the fill valve. Since the restrictor may also comprise a shortened horizontal outlet formed on the fill valve, step 230 may also comprise non-removably coupling the adapter to the horizontal outlet. Step 230 may also include coupling a refill hose to the adapter.

Step 240 comprises preventing a direct connection between the refill hose and the fill valve without interposing the adapter. In other words, the method 200 precludes a user from removing the restrictor and then reconnecting the refill hose directly to the fill valve for unrestricted flow. The method 200 necessarily requires that in order to provide fluid communication between the fill valve and a refill hose, a restrictor must be employed to couple the fill valve to the refill hose and thereby provide restricted fluid communication.

Many alterations and modifications may be made by those having ordinary skill in the art without departing from the spirit and scope of the invention. Therefore, it must be understood that the illustrated embodiments have been set forth only for the purposes of examples and that they should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification the generic structure, material or acts of which they represent a single species.

The definitions of the words or elements of the following claims are, therefore, defined in this specification to not only include the combination of elements which are literally set forth. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what incorporates the essential idea of the invention.

What is claimed is:

1. A toilet apparatus, comprising:
   a fill valve defining a refill port; and
   an adapter fixedly coupled to the fill valve and configured to direct fluid from the refill port to a refill hose, the adapter including:
      a proximal tubular portion,
      a distal tubular portion, and
      a securing mechanism fixedly coupled to the fill valve, wherein the securing mechanism prevents removal of the adapter from the fill valve without breaking the adapter, wherein the securing mechanism comprises a finger configured to hook into a vent hole of the fill valve, and wherein the finger is inserted flush underneath a top portion of the fill valve.

2. The apparatus of claim 1, wherein the fill valve comprises a laterally extending outlet that defines the refill port.

3. The apparatus of claim 2, wherein the laterally extending outlet comprises a tube with a lateral length between 0.1 inch to 0.8 inch.

4. The apparatus of claim 3, wherein: the proximal tubular portion comprises a proximal inner diameter and a proximal outer diameter, the proximal outer diameter being configured to form a press fit with the laterally extending tube.

5. The apparatus of claim 4, wherein the proximal inner diameter comprises a range between 0.1 inch and 0.6 inch.

6. The apparatus of claim 4, wherein: the distal tubular portion comprises a distal inner diameter and a distal outer diameter, the distal inner diameter comprises a range between 0.050 inch and 0.200 inch.

7. The apparatus of claim 1, wherein the securing mechanism comprises a finger configured to hook into a vent hole of the refill device.

8. A kit for use with a toilet apparatus, comprising:
   a first adapter configured to be fixedly coupled to a fill valve and configured to direct fluid from a fluid valve refill port on the fill valve to a refill hose, the first adapter having a proximal tubular portion with a proximal inner diameter, and a distal tubular portion with a distal inner diameter, and a securing mechanism configured to fixedly couple the first adapter to the fill valve, wherein the securing mechanism comprises a finger configured to hook into a vent hole of the fill valve, and wherein the finger is inserted flush underneath a top portion of the fill valve; and
   a second adapter configured to be fixedly coupled to a fill valve and configured to direct fluid from a fluid valve refill port on the fill valve to a refill hose, the second adapter having a proximal tubular portion with a proximal inner diameter that is the same as the proximal inner diameter of the first adapter, and wherein the distal inner diameter of the second adapter is greater than the distal inner diameter of the first adapter, the second adapter further comprising a securing mechanism configured to fixedly couple the second adapter to the fill valve, wherein the securing mechanism comprises a finger configured to hook into a vent hole of the fill valve, and wherein the finger is inserted flush underneath a top portion of the fill valve.

9. A toilet apparatus, comprising:
   a conduit defining a port, the conduit being configured to direct refill water to the port;
   a proximal tubular portion having a proximal inner diameter and a proximal outer diameter, the proximal outer diameter configured to form a press fit with the port;
   a distal tubular portion having a distal inner diameter and a distal outer diameter; and
   a securing mechanism for coupling the proximal tubular portion and the distal tubular portion to the conduit, wherein the securing mechanism prevents removal of the proximal tubular portion from the conduit without breaking the proximal tubular portion, wherein the securing mechanism comprises a finger configured to hook into a vent hole of a fill valve, and wherein the finger is inserted flush underneath a top portion of the fill valve.

10. The apparatus of claim 9, wherein: the conduit comprises a vertical annular wall; and the port is defined in the vertical annular wall.

11. The apparatus of claim 9, wherein: the conduit comprises a horizontal outlet; and the port is defined in the horizontal outlet.

12. The apparatus of claim 9, wherein: the distal inner diameter comprises a range between 0.050 inch and 0.200 inch.

* * * * *